(12) United States Patent
Fukuoka et al.

(10) Patent No.: US 6,465,984 B2
(45) Date of Patent: Oct. 15, 2002

(54) PSEUDO BATTERY PACK, BATTERY PACK, ELECTRONIC APPARATUS, AND ELECTRONIC APPARATUS SYSTEM AND METHOD

(75) Inventors: Kazuhito Fukuoka; Nobuo Tanaka; Hidekiyo Ozawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/729,850

(22) Filed: Dec. 6, 2000

(65) Prior Publication Data
US 2001/0035735 A1 Nov. 1, 2001

(30) Foreign Application Priority Data
Apr. 27, 2000 (JP) ........................................ 2000-127253

(51) Int. Cl.[7] .................................................. H02J 7/00
(52) U.S. Cl. ...................................................... 320/112
(58) Field of Search ................................ 320/112, 125, 320/128

(56) References Cited

U.S. PATENT DOCUMENTS 5,739,667 A * 4/1998 Matsuda et al. ............ 320/128
5,889,387 A * 3/1999 Massie ....................... 320/145
5,929,603 A   7/1999 Nakao et al. ................ 320/136
5,986,437 A * 11/1999 Lee ............................ 320/125
6,100,669 A * 8/2000 Tokita ........................ 320/149
6,114,831 A * 9/2000 Attimont et al. ............ 320/106

FOREIGN PATENT DOCUMENTS

| JP | SHO63-75914 | 4/1988 |
| JP | HEI4-205298 | 7/1992 |
| JP | HEI5-276679 | 10/1993 |
| JP | HEI8-182219 | 7/1996 |
| JP | HEI9-215213 | 8/1997 |

* cited by examiner

Primary Examiner—Edward H. Tso
Assistant Examiner—Pia Tibbits
(74) Attorney, Agent, or Firm—Staas & Halsey LLP

(57) ABSTRACT

An electronic apparatus system includes a battery pack housing batteries and a battery pack connection section connecting the battery pack to the electronic apparatus, the electronic apparatus operable with one of electric power from an external power supply and electric power from the battery pack. A pseudo battery pack includes a power holding unit holding electric power to be supplied to the electronic apparatus, wherein if the external power supply is used and the external power supply fails to supply the electric power, the pseudo battery pack is mounted on the battery pack connection section.

19 Claims, 9 Drawing Sheets

PSEUDO BATTERY PACK, BATTERY PACK, ELECTRONIC APPARATUS, AND ELECTRONIC APPARATUS SYSTEM AND METHOD

BACKGROUND OF THE INVENTION

1. Field of the Invention

The present invention relates to a battery pack, which is mounted on a portable type of electronic apparatus such as a note type of personal computer, a PDA, a mobile personal computer, or another type of electronic apparatus, a pseudo battery pack modeled on the battery pack, an electronic apparatus, and an electronic apparatus system.

2. Description of the Related Art

Different types portable of electronic apparatuses, such as notebook computers and the like are arranged so that they are operable by electric power obtained from an external power supply, for example, a commercial power supply via an AC adapter, a car adapter wherein voltage from a car battery is converted into regular voltage, or a battery pack incorporated in the computer as well. Here, a notebook personal computer will be explained by way of example.

A battery pack is very convenient for a user who often uses the personal computer where an external power supply, such as a commercial power supply is not available. There are, however, many users who use the personal computer as a desk computer.

Recently, as the higher-level function and the higher speed of processing are required of the personal computer, the dissipation power of the personal computer is increased, while miniaturization of an AC adapter is required because of improvement of portability of the personal computer. Miniaturization of an AC adapter is implemented, to some extent, through improvement of efficiency for a control circuit. However, as larger tolerance and miniaturization of the AC adapter are implemented, it becomes difficult to expect an assurance for a momentary power cut of the external power supply, such as the commercial power supply by the AC adapter. Specifically, to ensure operation of the personal computer for the momentary power cut from the external power supply, such as the commercial power supply, there is a need to store energy at a predetermined level ensuring operation of the personal computer until the power supply is recovered. However, in view of the tendency that the dissipation power of the personal computer is increased and the AC adapter is miniaturized, it is difficult to make the AC adapter to ensure operation during the momentary power cut. In view of the foregoing, in general AC adapters do not ensure operation during the momentary power cut of the external power supply such as the commercial power supply.

The personal computer is an electronic apparatus in which it is essentially expected that a battery pack is mounted therein, assuring operation during the momentary power cut of the external power supply such as the commercial power supply, the battery pack rather than the AC adapter provides power to the personal computer.

However, because typical battery packs incorporate thereinto secondary batteries, these battery packs are relatively expensive. The secondary battery is an expendable source and is not long in life time. Also the battery pack is large in load for the user who uses the personal computer on a desk, where the battery pack is mounted for momentary power cuts.

SUMMARY OF THE INVENTION

It is intended that an AC adapter is minimized, it is considered that the current (rated current), which can be derived from the AC adapter, is decreased. A notebook personal computer is not operated always at a constant power, but is usually operated at a current level, which is considerably lower than a current of a level near the rated current. Consequently, the battery pack is mounted on the personal computer where the rated current of the AC adapter is lowered, and when the personal computer is operated in the usual low current level, the secondary battery of the battery pack is charged. When a large current is needed instantaneously, a shortage of the current capacity of the AC adapter is complemented with the secondary battery in the battery pack. In this manner, it is ensured that the battery pack is mounted on the personal computer and it is possible to miniaturize the AC adapter through lowering the rated current of the AC adapter. In this case, however, it is obliged to mount the battery pack on the personal computer. Thus, this case also brings about too much load for a user who uses the personal computer on a desk.

In view of the foregoing, it is an object of the present invention to measure a momentary power cut and a large current, which will be needed momentarily, upon reducing a load.

An electronic apparatus system, including: a battery pack housing batteries; a battery pack connection section connecting the battery pack to the electronic apparatus, the electronic apparatus operable with one of electric power from an external power supply and electric power from the battery pack; and a pseudo battery pack including a power holding unit holding electric power to be supplied to the electronic apparatus, wherein if the external power supply is used and the external power supply fails to supply the electric power, the pseudo battery pack is mounted on the battery pack connection section.

An electronic apparatus system, including: a battery pack housing batteries; a battery pack connection section connecting the battery pack to the electronic apparatus, the electronic apparatus operable with one of electric power from an external power supply and electric power from the battery pack; and a pseudo battery pack including a power holding unit holding electric power to be supplied to the electronic apparatus, wherein if the external power supply is used and the external power supply is short in supplying electric power, the pseudo battery pack is mounted on the battery pack connection section.

A battery pack in an electronic apparatus including a battery pack connection section connecting the battery pack, the electronic apparatus being operable with one of electric power from an external power supply and electric power from the battery pack, the battery pack including: a battery; and a power holding unit holding electric power to be supplied to the electronic apparatus when the external power supply is short in power supply.

An electronic apparatus operative with electric power from an external power supply, the electronic apparatus including: a power holding unit charged with electric power from the external power supply to hold electric power to be supplied to the electronic apparatus, when the external power supply fails to supply the electric power; a charging path preventing or reducing in-rush current and charging the power holding unit upon receipt of a supply of the electric power from the external power supply; and a power supplying path supplying charged electric power stored in the power holding unit to the electronic apparatus while preventing a backflow of the power, the power supplying path being different from the charging path.

An electronic apparatus operative with electric power from an external power supply, the electronic apparatus including: a power holding unit charged with electric power from the external power supply to hold electric power to be supplied to the electronic apparatus, when the external power supply is short in power supply; a charging path preventing or reducing in-rush current and charging the power holding unit upon receipt of a supply of the electric power from the external power supply; and a power supplying path supplying charged electric power stored in the power holding unit to the electronic apparatus while preventing a backflow of the power, the power supplying path being different from the charging path.

A pseudo battery pack for an electronic apparatus, including: a battery pack mounting section to which a battery pack for housing batteries is detachably mounted, the electronic apparatus being operable with one of electric power from an external power supply and electric power from the battery pack, wherein the pseudo battery pack includes capacitors connected in parallel, and the pseudo battery pack is mounted on the battery pack mounting section.

An electronic apparatus system, including: a battery pack housing batteries; an electronic apparatus including a battery pack mounting section to which the battery pack is detachably mounted, the electronic apparatus being operable with one of electric power from an external power supply and electric power from the battery pack; and a pseudo battery pack including capacitors connected in parallel, the pseudo battery pack being mounted on the battery pack mounting section.

A system, including: an electronic apparatus; a pseudo battery pack; and a battery pack housing batteries detachably mounted to the electronic apparatus, the electronic apparatus being operable with one of electric power from an external power supply and electric power from the battery pack, wherein the pseudo battery pack includes capacitors connected in parallel, and the pseudo battery pack includes substantially same configuration as the battery pack.

An electronic apparatus system, including: an electronic apparatus; a battery pack housing batteries detachably mounted to the electronic apparatus, the electronic apparatus being operable with one of electric power from an external power supply and electric power from the battery pack; and a pseudo battery pack including capacitors connected in parallel, the pseudo battery pack including substantially same configuration as the battery pack, and being detachably mounted on the electronic apparatus.

An electronic apparatus system, including: a battery pack housing secondary batteries; an electronic apparatus to which the battery pack is detachably mounted, the electronic apparatus being operable with one of electric power from an external power supply and electric power from the battery pack; and a pseudo battery pack including capacitors connected in parallel, the pseudo battery pack including substantially same configuration as the battery pack, and being detachably mounted on the electronic apparatus.

A system, including: a battery pack housing batteries; an electronic apparatus to which the battery pack is detachably mounted, the electronic apparatus being operable with one of electric power from an external power supply and electric power from the battery pack; and a capacitor in the battery pack connected in parallel with the housed batteries.

An electronic apparatus operative with electric power from an external power supply, the electronic apparatus, including: a capacitor charged with electric power from the external power supply and supplying a charged electric power to the electronic apparatus to operate during a predetermined time, when the external power supply fails to supply the electronic power; a charging path preventing or reducing in-rush current and charging the capacitor upon receipt of a supply of the electric power from the external power supply; and a power supplying path supplying charged electric power stored in the capacitor while preventing a backflow of the power, the power supplying path being different from the charging path.

An electronic apparatus operative with electric power from an external power supply, the electronic apparatus, including: a capacitor charged with electric power from the external power supply and supplying a charged electric power to the electronic apparatus to operate during a predetermined time, when the external power supply is short in power supply; a charging path preventing or reducing in-rush current and charging the capacitor upon receipt of a supply of the electric power from the external power supply; and a power supplying path supplying charged electric power stored in the capacitor while preventing a backflow of the power, the power supplying path being different from the charging path.

BRIEF DESCRIPTION OF THE DRAWINGS

The above objects and advantages will be more apparent by describing the preferred embodiment of the present invention with reference to the accompanied reference drawings, in which.

DETAILED DESCRIPTION OF PREFERRED EMBODIMENTS

Embodiments of the present invention will be described with reference to the accompanying drawings.

Figure 1:
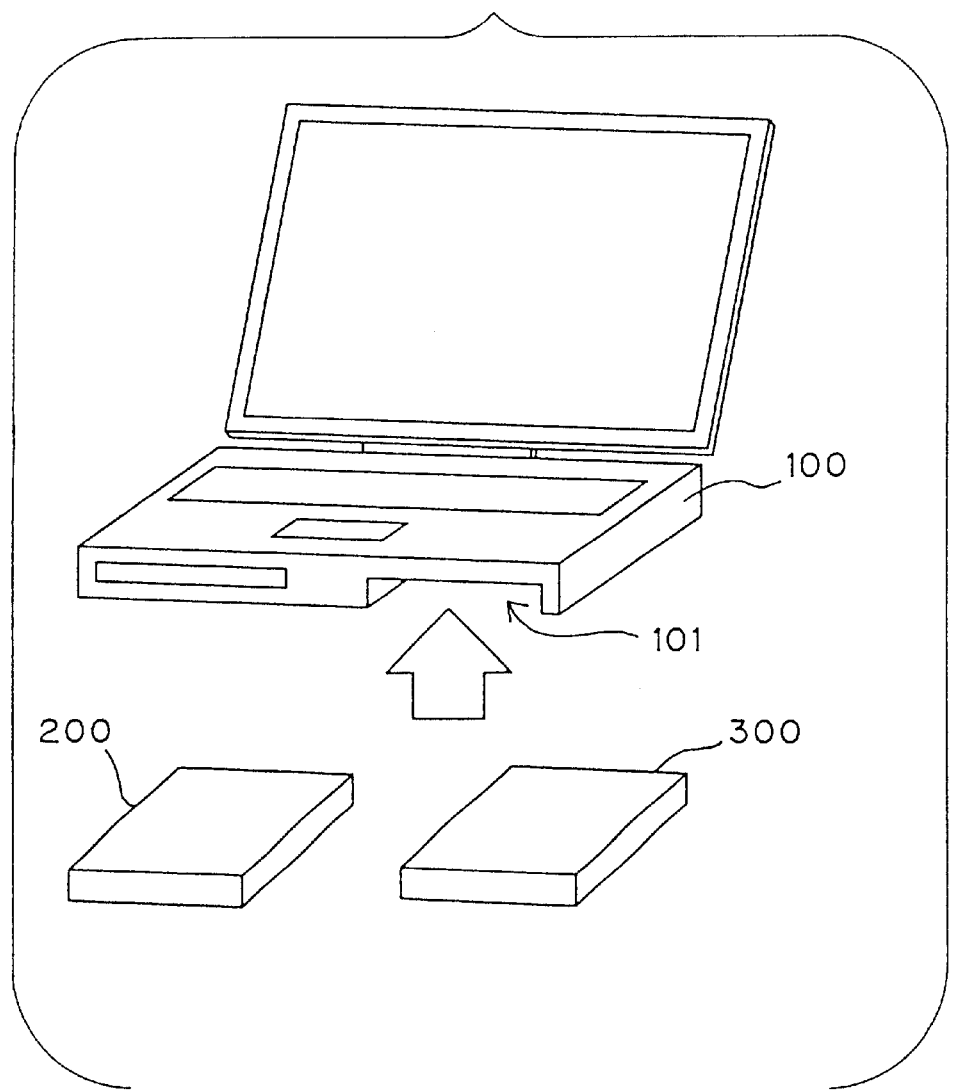
FIG. 1 is a schematic diagram of a system comprising a note type of personal computer, a battery pack, and a pseudo battery pack.

FIG. 1 is a schematic diagram of a system comprising a personal computer, such as a notebook personal computer, a battery pack, and a pseudo battery pack.

The personal computer 100 is provided with a battery pack mounting slot 101 which is an example of a battery pack mounting section. A battery pack 200 is mounted through the battery pack mounting slot 101. Further, it is possible to mount on the battery pack mounting slot 101 a pseudo battery pack 300 having the substantially same configuration as the battery pack 200, instead of the battery pack 200.

In FIG. 1, it is possible to mount on the battery pack mounting slot 101 a pseudo battery pack 300 having the substantially same configuration as the battery pack 200. The pseudo battery pack has substantially the same configuration as the battery pack, but it is not restricted to this configuration. As far as it is possible to mount a pseudo battery pack on the battery pack mounting slot 101, which is an example of the battery pack mounting section of the electronic apparatus, it is acceptable that the pseudo battery pack 300 has any other types of configurations which are not substantially same as the battery pack 200. For example, it is acceptable that the pseudo battery pack 300 has thinner configuration, shorter configuration, smaller configuration or thicker configuration than the battery pack 200. Particularly, in such a type of electronic apparatus where the battery pack 200 is inserted from a side of a cover member into an insertion slot, and the battery pack 200 is completely housed inside the electronic apparatus, those features are effective. According to the personal computer 100 shown in FIG. 1, the bottom of the battery pack 200 forms the bottom of the personal computer 100 when the battery pack 200 is mounted. Thus, in this case, the pseudo battery pack 300 may have substantially the same configuration as the battery pack 200. However, in the event that the bottom of the battery pack 200 does not form the bottom of the personal computer 100, it is acceptable that the pseudo battery pack 300 does not have substantially the same configuration as the battery pack 200. Further, as shown in FIG. 1, even in a case where the battery pack 200 is mounted on the bottom, it is acceptable that the pseudo battery pack 300, which is larger than the battery pack 200, is used to provide a tilt function. As mentioned above, the present invention does not exclude a case where the pseudo battery pack 300 is different in shape from the battery pack 200.

Figure 2:
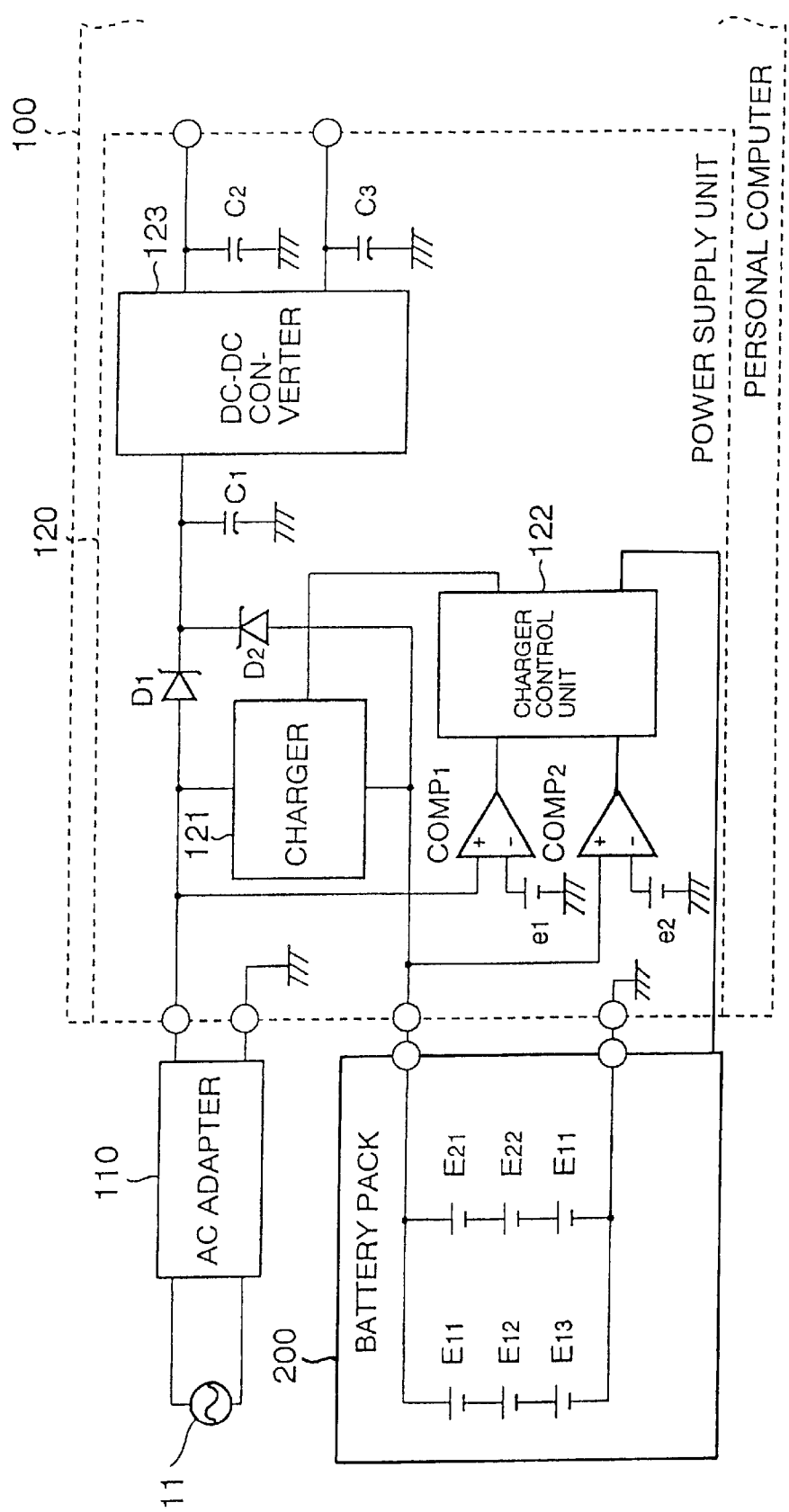
FIG. 2 is a block diagram showing a circuit structure of a power supply section in a state that a battery pack is mounted on a personal computer.

FIG. 2 is a block diagram showing a circuit structure of a power supply section in a state that a battery pack is mounted on the personal computer, such as a notebook personal computer.

An AC adapter 110 is attached or connected to the note type of personal computer 100. The AC adapter 110 has a function where electric power of the external power supply, such as a commercial power supply 11 is converted into electric power of DC voltage of, for example, 16.0V, and then supplied to a power supply section 120. The electric power supplied from the AC adapter 110 to the power supply section 120 of the personal computer 100 is supplied via a charger 121 to the battery pack 200, and is also supplied via a diode D1 to a DC—DC converter 123.

According to the present embodiment, as a preferable embodiment, there is shown the AC adapter 110 by way of example. However, it is acceptable that electric power is supplied from a car battery adapter for converting a voltage of a car battery.

Further it is noted that the external power supply is not restricted to the commercial power supply, and it is acceptable that a car battery is adopted as the external power supply.

The battery pack 200 houses therein total six chargeable secondary batteries E11, E12, E13, E21, E22 and E23 connected as shown in FIG. 2. A comparator COMP1, which is provided on the power supply section 120 of the personal computer 100, compares a voltage from the external power supply such as the AC adapter 110 with a reference voltage e1, so that it is determined whether electronic power is supplied from the commercial power supply 11 via the AC adapter 110. A comparator COMP2 compares a voltage from the battery pack 200 with a reference voltage e2, so that it is determined whether the battery pack 200 is mounted. Determination results of the comparators COMP1 and COMP2 are fed to a charge control unit 122. The charge control unit 122 activates a charger 121 in accordance with the determination results in the event that the power is supplied from the AC adapter 110, and the battery pack 200 is mounted. The charger 121 charges, upon receipt of control of the charge control unit 122, the secondary batteries E11, E12, E13, E21, E22 and E23 of the battery pack 200 with the electric power from the AC adapter 110.

The power from the AC adapter 110 is transferred via the diode D1 to the DC—DC converter 123. The DC—DC converter 123 converts the power from the AC adapter 110 into an electric power of a voltage to be used by the personal computer 100. According to the embodiment shown in FIG. 2, there are provided two lines of output from the DC—DC converter 123. This means that the DC—DC converter 123 generates powers of two types of voltage mutually different. Capacitor C1, which is disposed at the input side of the DC—DC converter 123, and capacitors C2 and C3, which are disposed at the output side of the DC—DC converter 123 are capacitors for voltage stabilizing. The electric powers generated in the DC—DC converter 123 are supplied to associated circuits, which are operative with the associated voltages, respectively, in the personal computer 100 in accordance with the voltages.

When the AC adapter 110 is not connected, power (e.g. power of 12.6V or so) of the secondary batteries E11, E12, E13, E21, E22 and E23 housed in the battery pack 200 is converted through the diode D2 by the DC—DC converter 123 into a predetermined voltage of power, so that the converted power is supplied to the associated circuit of the note type of personal computer 100.

This is the same also in the event that the momentary power cut occurs on the external power supply such as the commercial power supply 11. The note type of personal computer 100 continues to operate during the momentary power cut upon receipt of the power from the battery pack 200. The above-mentioned momentary power cut is an example in the event that power is not supplied from the external power supply. Further, in the even that while the AC adapter 110 is sufficient for supplying power corresponding to the steady-state dissipation power of the note type of personal computer 100, the AC adapter 110 is insufficient for supplying a momentary peak power needed for an operation of the note type of personal computer 100, the battery pack 200 has a function of supplementing the shortage of the supplying power from the AC adapter 110 at a timing where the momentary peak power is needed. The timing where the momentary peak power is needed is an example of a case where a power supply ability of the external power supply is insufficient.

Figure 3:
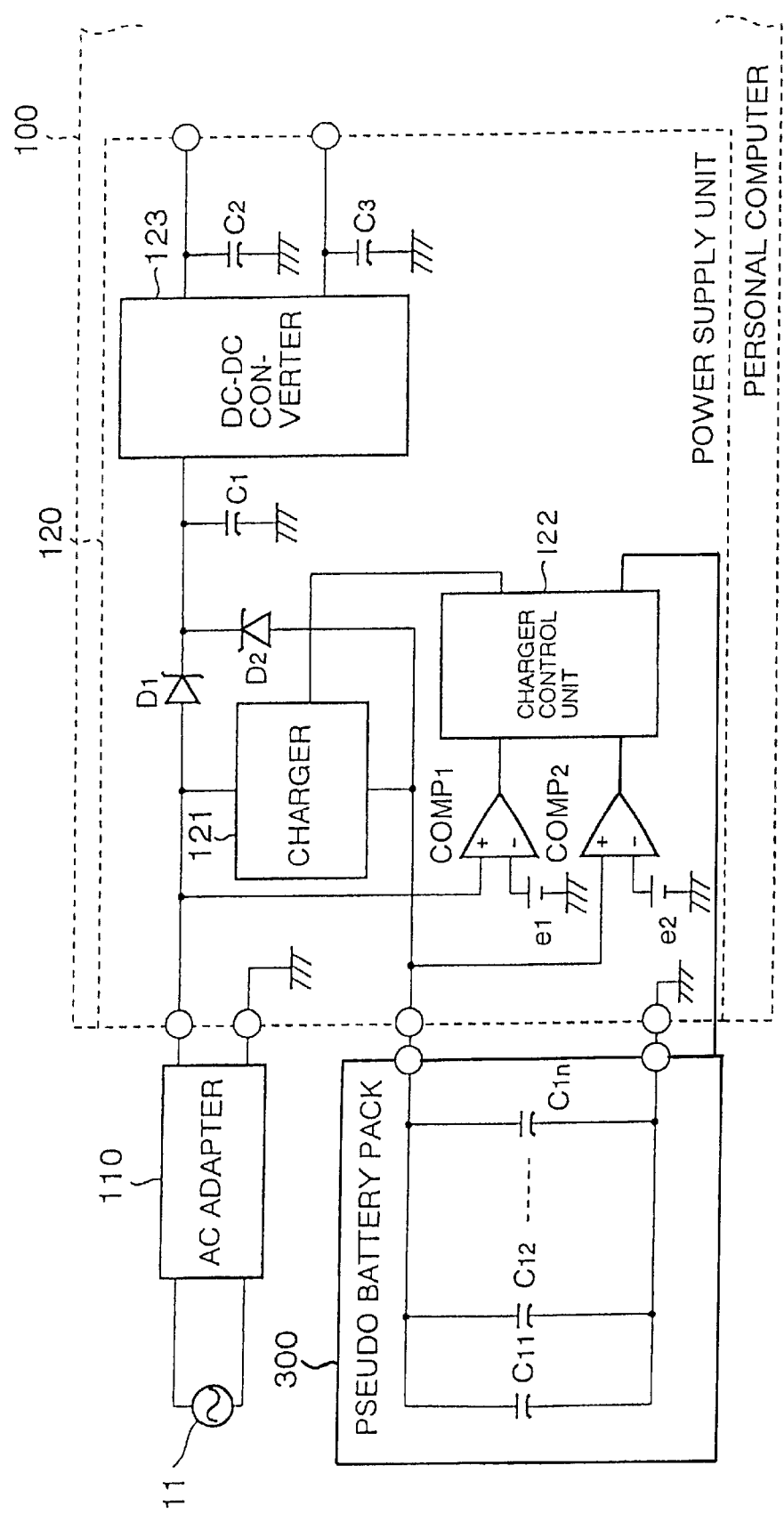
FIG. 3 is a block diagram showing a circuit structure of a power supply section where a pseudo battery pack is mounted on a personal computer.

FIG. 3 is a block diagram showing a circuit structure of a power supply section in a state that a pseudo battery pack is mounted on the personal computer.

A different point of the circuit structure of a power supply section from the circuit structure shown in FIG. 2 resides in the point that the battery pack 200 shown in FIG. 2 is replaced by a pseudo battery pack 300. The pseudo battery pack 300 incorporates therein a plurality of capacitors C11, C12, . . . C1n which are connected in parallel.

In the event that the pseudo battery pack 300 shown in FIG. 3, instead of the battery pack 200 shown in FIG. 2, is mounted on the note type of personal computer 100, it is impossible to operate the personal computer 100 in a state that the AC adapter 110 is removed from the personal computer 100. However, in the event that the personal computer 100 is used as a desktop computer there is no problem. That is, when momentary power cut occurs on the external power supply such as the commercial power supply 11, it is possible to continue to operate the personal computer 100 by electric power stored in the internal capacitors C11, C12, . . . C1n of the pseudo battery pack 300 as far as it concerns with a short time such as a momentary power cut or so, thereby the internal capacitors C1, C12, . . . C1n act as power holding units or power storing units. In a timing that the personal computer 100 is operated while the AC adapter 110 is connected, a peak power is required momentarily, the electric power stored in the internal capacitors C11, C12, . . . C1n of the pseudo battery pack 300 is outputted so that the shortage of the supplying power from the AC adapter 110 is complemented.

The capacitors C11, C12, . . . C1n are rather inexpensive as compared with the secondary batteries E11 . . . E23 in the battery pack 200 shown in FIG. 2, and therefore the pseudo battery pack 300 is inexpensive compared to the battery pack 200 whereby it is avoided that a user, who uses the personal computer 100 as a desktop is forced to be subjected to too much load.

Figure 4:
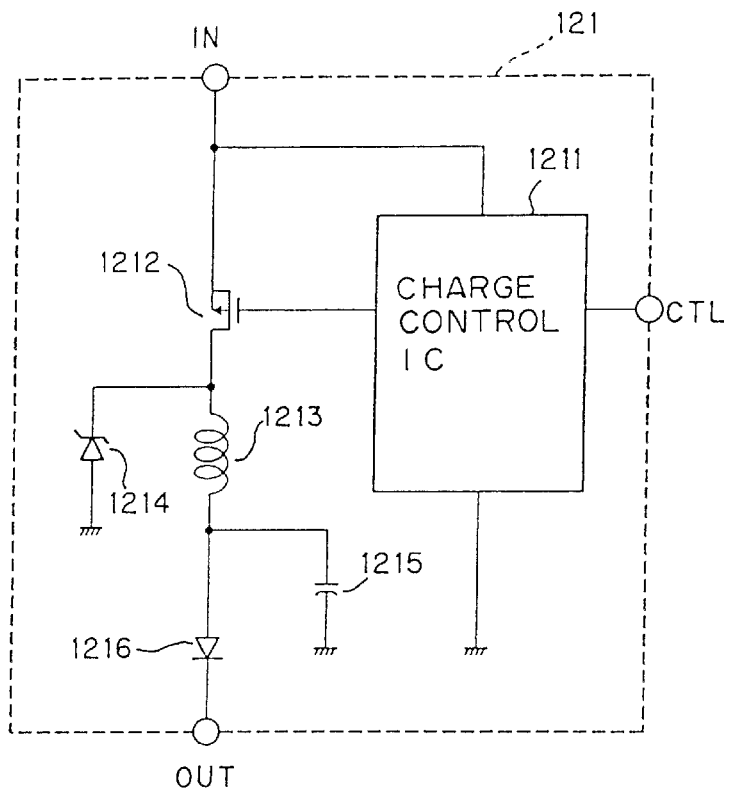
FIG. 4 is a circuit diagram of an internal structure of a charger shown in FIGS. 2 and 3.

FIG. 4 is a circuit diagram of an internal structure of the charger 121 shown in FIGS. 2 and 3.

The charger 121 is provided with a charge control IC 1211. The charge control IC 1211 receives via a control terminal CTL from the charger control unit 122 shown in FIGS. 2 and 3 an instruction for a charge indicating that the AC adapter 110 and the battery pack 200 (or the pseudo battery pack 300) are properly connected or mounted. Upon receipt of the charge instruction, the charge control IC 1211 controls a MOS transistor for current control. In case of the pseudo battery pack 300, however, the pseudo battery pack 300 is mounted in a state that an electric power is not stored at all. Consequently, the charger control unit 122 shown in FIG. 3 outputs the charge instruction to the charger 121 using a signal as well from a switch (not illustrated) for detecting whether the pseudo battery pack 300 is mounted.

An input terminal IN of the charger 121 shown in FIG. 4 is a terminal for receiving an electric power from the AC adapter 110. An output terminal OUT is a terminal for supplying electric power to the battery pack 200 (or the pseudo battery pack 300).

Upon receipt of an instruction of a charge via the control terminal CTL, the charge control IC 1211 controls a gate voltage of a MOS transistor 1212 so that a predetermined current conducts through the MOS transistor 1212. The current conducted through the MOS transistor 1212 is outputted via an in-rush current preventing filter, which comprises a coil 1213 and a capacitor 1215, and further via a diode 1216 through an output terminal OUT and is supplied to the battery pack 200 or the pseudo battery pack 300. A Zener diode 1214 is a voltage limiting device for preventing a sudden high voltage from being applied to the battery pack 200 or the pseudo battery pack 300.

Figure 5:
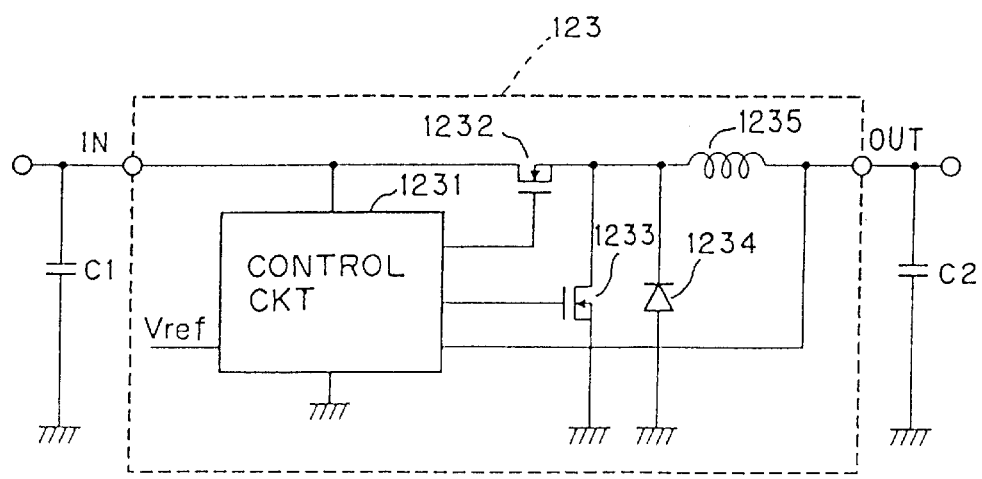
FIG. 5 is a circuit diagram of an internal structure of a DC—DC converter shown in FIGS. 2 and 3.

FIG. 5 is a circuit diagram of an internal structure of the DC—DC converters shown in FIGS. 2 and 3. While FIGS. 2 and 3 show the DC—DC converters each for generating two lines of power mutually different in voltage, FIG. 5 shows only a line of circuit.

The DC power generated by the AC adapter 110 shown in FIGS. 2 and 3 is fed via the diode D1 to an input terminal IN of the DC—DC converter 123 shown in FIG. 5. The DC power supplied through the input terminal IN passes through a main switching transistor 1232 and a coil 1235 and is converted into predetermined voltage (e.g. 5.0V), which is lower than the input voltage (e.g. 16.0V), and then supplied through an output terminal OUT to the internal circuits of the note type of personal computer 100.

A control circuit 1231 applies to a gate of the main switching transistor 1232 a pulse signal to intermittently turn on and off the main switching transistor 1232. The control circuit 1231 also applies to a gate of a synchronization rectifying transistor 1233 a pulse signal to intermittently turn on and off the synchronization rectifying transistor 1233. The control circuit 1231 receives a reference voltage Vref from the exterior and a voltage of the output terminal OUT as well. The control circuit 1231 controls a pulse width of the pulse signal to be applied to the gate of the main switching transistor 1232 so that a voltage of the output terminal OUT becomes a voltage (typically the same voltage as the reference voltage Vref) associated with the reference voltage Vref. And also, with respect to the pulse signal to be applied to the synchronization rectifying transistor 1233, the control circuit 1231 performs a pulse timing control and a pulse width control so as not to overlap with a pulse to be applied to the main switching transistor 1232 (so as not to simultaneously turn on the main switching transistor 1232 and the synchronization rectifying transistor 1233).

A diode 1234, which is connected in parallel with the synchronization rectifying transistor 1233, is a flywheel diode which is operative when both, the main switching transistor 1232 and the synchronization rectifying transistor 1233 turn off.

When the main switching transistor 1232 turns on, an electric power is stored in the coil 1235. And when the main switching transistor 1232 turns off, a current conducts through the diode 1234 or the synchronization rectifying transistor 1233, so that the power stored in the coil 1235 is discharged through the output terminal OUT. Repeat of this cycle and voltage smoothing effect by the capacitor C2 makes it possible to output an electric power of DC voltage according to a pulse width of the pulse to be applied via the output terminal OUT to the main switching transistor 1232.

Since the flywheel diode 1234 is associated with a forward potential drop, the combination use of the flywheel diode 1234 with the synchronization rectifying transistor 1233 makes it possible to perform effective power conversion.

Figure 6:
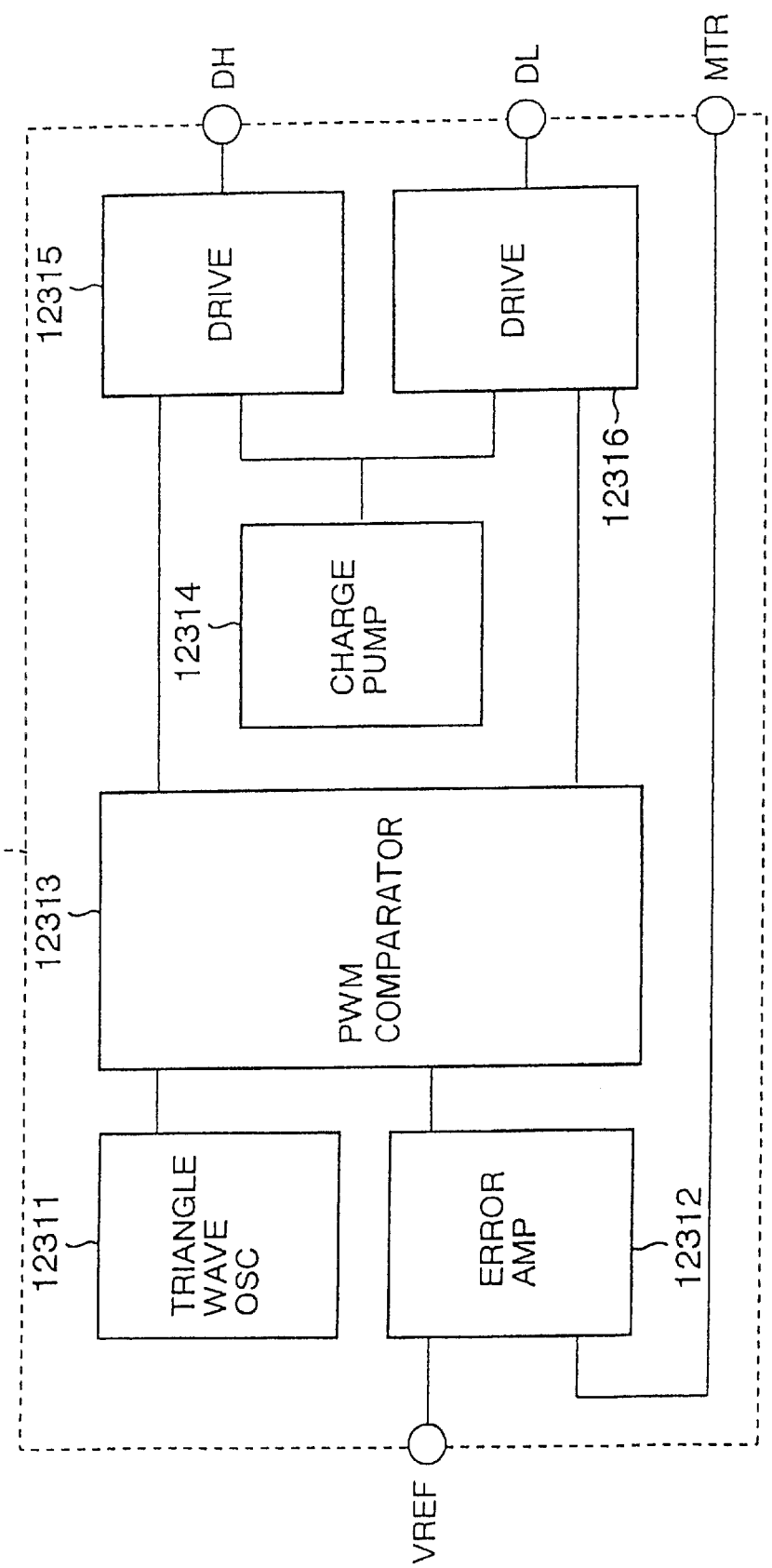
FIG. 6 is a block diagram showing an internal structure of a control circuit of a DC—DC converter shown in FIG. 5.

FIG. 6 is a block diagram showing an internal structure of the control circuit 1231 of the DC—DC converter 123 shown in FIG. 5.

An error amplifier 12312 receives a reference voltage Vref from a reference voltage input terminal VREF, and also receives from a monitor voltage input terminal MTR a voltage (output voltage) of the output terminal OUT of the DC—DC converter 123 shown in FIG. 5. The error amplifier 12312 determines an error (difference) from the reference voltage Vref of the output voltage. The error amplifier 12312 feeds the error thus determined to a PWM comparator 12313.

The PWM comparator 12313 also receives a triangle wave generated by a triangle wave oscillator 12311. The PWM comparator 12313 compares the triangle wave entered from the triangle wave oscillator 12311 with a predetermined voltage value adjusted in accordance with the error output from the error amplifier 12312 to generate a pulse train. Each pulse of the pulse train has a pulse width adjusted in accordance with the output of the error amplifier 12312 (or an error of the output voltage from the reference voltage Vref). The pulse train is fed to a drive circuit 12315 as a control signal for turning on and off the main switching transistor 1232 of the DC—DC converter 123 shown in FIG. 5.

The PWM comparator 12313 generates a pulse signal comprising a pulse train in timing not overlapping with the pulse train generated through comparison with the triangle wave (or the pulse train) as the control signal for turning on and off the main switching transistor 1232. The pulse signal is fed to another drive circuit 12316 as a control signal for turning on and off the synchronization rectifying transistor 1233 of the DC—DC converter 123 shown in FIG. 5.

The control circuit 1231 further comprises a charge pump 12314. The charge pump 12314 is a circuit for generating a voltage which is somewhat higher than a voltage of a power generated from the AC adapter 110 (cf. FIGS. 2 and 3).

The reason the charge pump 12314 is provided is because in order to surely turn on the main switching transistor 1232 and the synchronization rectifying transistor 1233, which constitute the DC—DC converter 123 shown in FIG. 5, there is a need to provide a high voltage to some extent.

The drive circuits 12315 and 12316 generate drive signals of the voltage generated in the charge pump 12314 to drive the main switching transistor 1232 and the synchronization rectifying transistor 1233 in accordance with the applied pulse signals, respectively. The drive signals thus generated are transmitted via drive signal output terminals HD and DL to the main switching transistor 1232 and the synchronization rectifying transistor 1233, respectively.

Next, there will be explained a second embodiment of a system comprising a personal computer, such as a notebook personal computer, a battery pack, and a pseudo battery pack. The second embodiment of the system is the same as the system shown in FIG. 1 in structure, and thus redundant explanation will be omitted.

Figure 7:
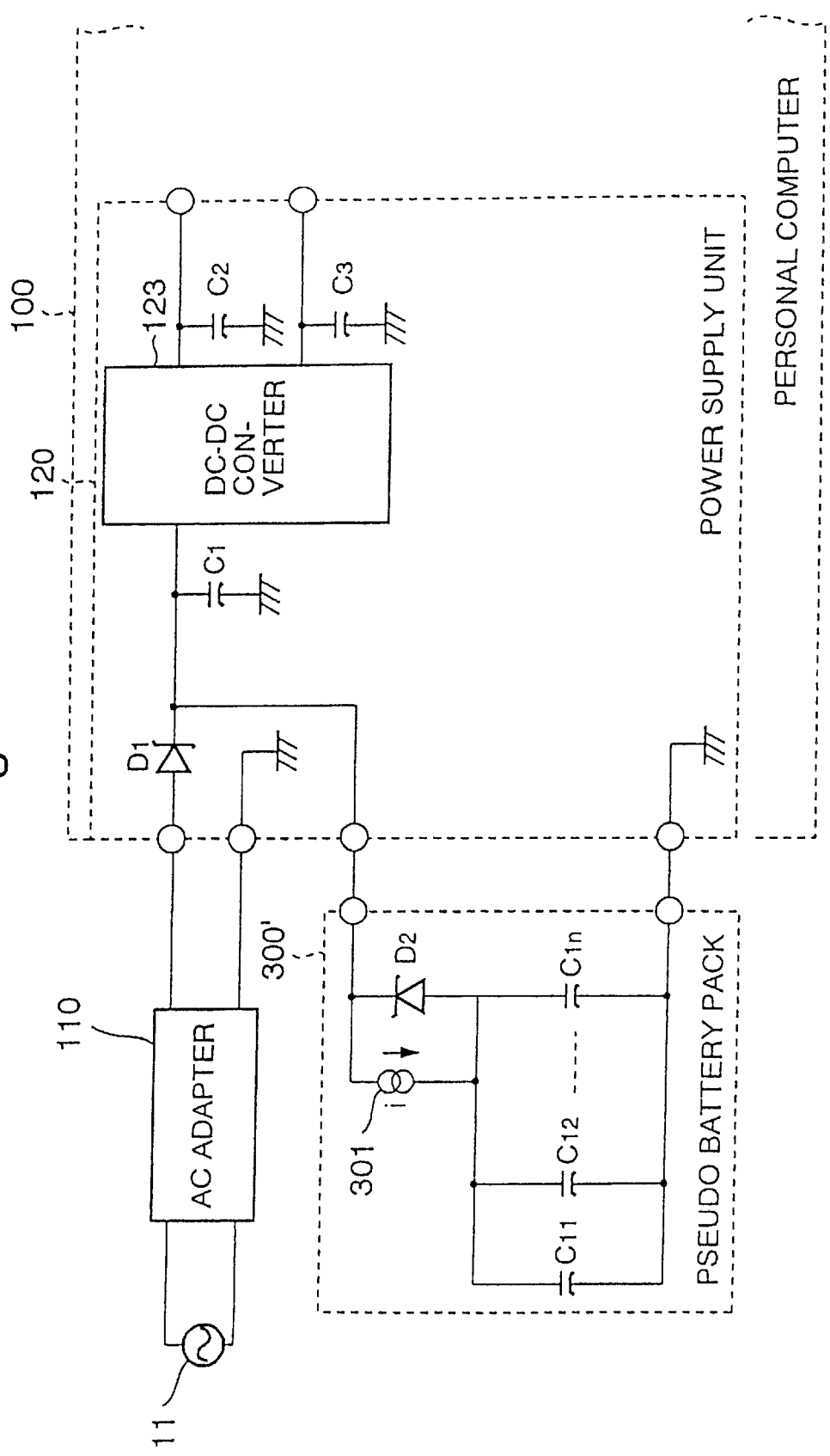
FIG. 7 is a block diagram showing a circuit structure of a power supply section in a state that a pseudo battery pack is mounted on a note type of personal computer, in a system according to a second embodiment.

FIG. 7 is a block diagram showing a circuit structure of a power supply section in a state that a pseudo battery pack is mounted on the personal computer, in the system according to the second embodiment.

A power supply section 120 shown in FIG. 7 comprises a DC—DC converter 123, capacitors C1, C2 and C3 for stabilizing voltages, and a diode D1 for transmitting an electric power from the AC adapter 110 to the DC—DC converter 123, and is not provided with charging facilities comprising the charger 121, the charge control section 122 and two comparators COMP1 and COMP2 as shown in FIGS. 2 and 3. The diode D2, as shown in FIGS. 2 and 3, which is provided on the path for transmitting the power from the battery pack 200 or the pseudo battery pack 300 to the DC—DC converter 123, is provided inside a pseudo battery pack 300' in FIG. 7.

The pseudo battery pack 300' in FIG. 7 comprises internal capacitors C11, C12, . . . , C1n, a constant current source 301 for charging those internal capacitors, and a diode D2 disposed on a path for transmitting electric power stored in those internal capacitors to the DC—DC converter 123.

In case of the pseudo battery pack 300' in FIG. 7, the charging path for charging the internal capacitors C11, C12, . . . , C1n and the power supplying path for supplying charged electric power stored in those internal capacitors to the DC—DC converter 123 are separated from one another. On the charging path, there is disposed the constant current source 301 for charging those internal capacitors of the pseudo battery pack 300', and thereby preventing an in-rush current from occurring even if the internal capacitors are empty. On the power supplying path, there is disposed the diode D2 to prevent the backflow of the power.

Figure 8:
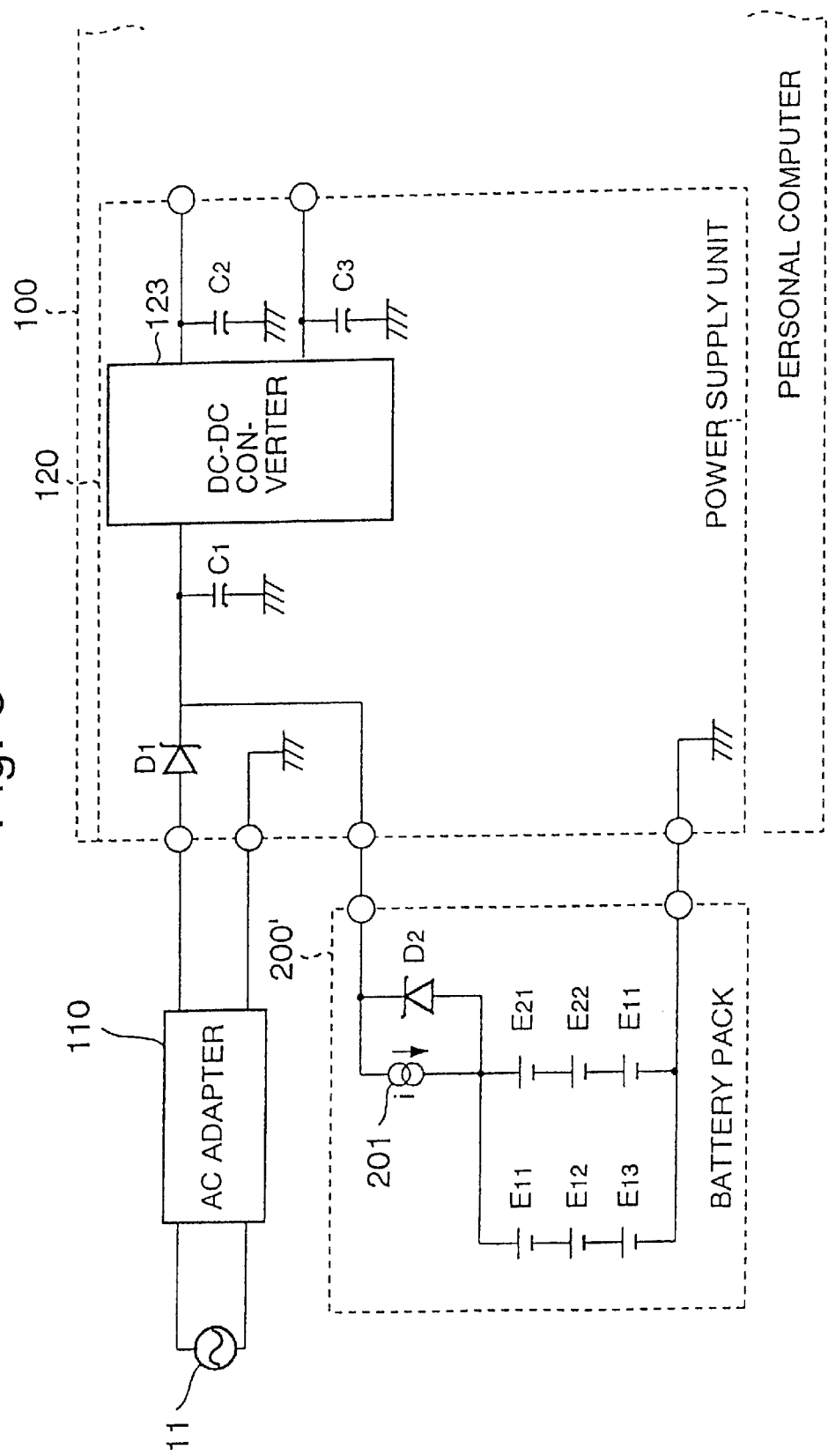
FIG. 8 is a block diagram showing a circuit structure of a power supply section in a state that a battery pack is mounted on the personal computer, in a system according to a second embodiment.

FIG. 8 is a block diagram showing a circuit structure of a power supply section where a battery pack is mounted on the personal computer, in the system according to the second embodiment.

Here, there is shown a battery pack 200' instead of the pseudo battery pack shown in FIG. 7.

The battery pack 200' comprises secondary batteries E11 to E23, a constant current source 201 for preventing in-rush current, and a diode D2 for preventing a backflow. Operations of the constant current source 201 and the diode D2 are the same as the constant current source 301 and the diode D2 of the pseudo battery pack 300', respectively, and thus redundant explanation will be omitted.

As shown in FIGS. 7 and 8, it is acceptable that the battery pack and the pseudo battery pack are provided with a charging function per se.

Figure 9:
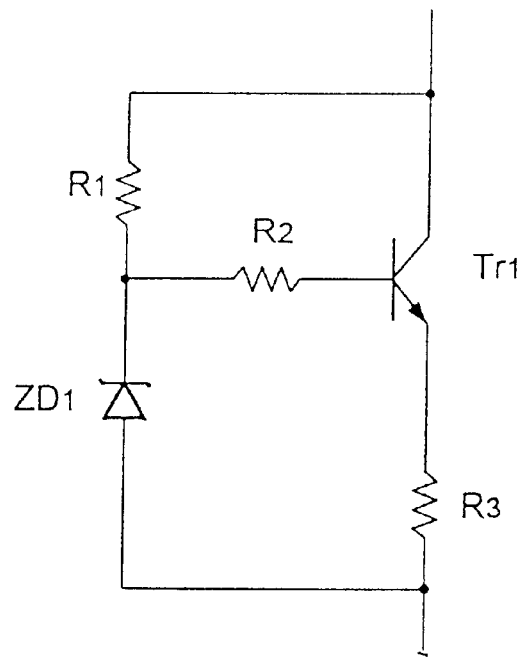
FIG. 9 is a circuit diagram showing an example of a constant current source provided on the battery pack and the pseudo battery pack shown in FIGS. 7 and 8, respectively.

FIG. 9 is a circuit diagram showing an example of a constant current source provided on the battery pack and the pseudo battery pack shown in FIGS. 7 and 8, respectively.

A certain constant voltage, which is generated in a Zener diode ZD1, is applied to a base of a transistor Tr1, so that a constant current conducts from a collector of the transistor Tr1 to an emitter of the transistor Tr1. The current conducting through the transistor Tr1 is controlled by a base voltage, so that the in-rush current is prevented from entering, even if the internal capacitors of the pseudo battery pack are empty.

Figure 10:
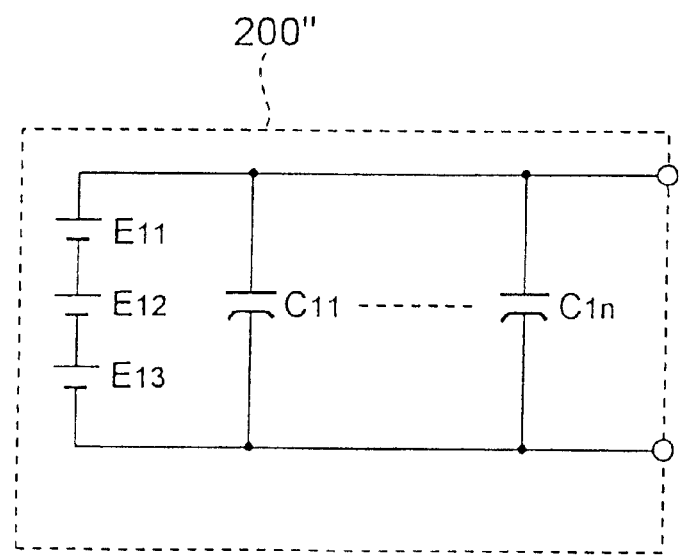
FIG. 10 is a diagram showing an embodiment of a battery pack according to the present invention.

FIG. 10 is a diagram showing an embodiment of a battery pack according to the present invention.

A battery pack 200" may be adopted instead of the battery pack shown in FIGS. 1 and 2. As compared with the battery pack 200 shown in FIG. 2, the battery pack 200" is few in the number of the secondary batteries, instead there are provided capacitors disposed in parallel with the secondary batteries.

As mentioned above, electric power needed for operation of the personal computer 100 is not always constant, but sometimes exceeds the usual electric power. In an exemplary embodiment, the AC adapter 110 is removed from the note type of personal computer 100 so as to operate only with the battery pack. In this case, there is a need for the secondary batteries in the battery pack to store an electric power corresponding to the electric power to be consumed in the note type of personal computer 100 within a certain time, and to be capable of sufficiently supplying a peak power which will sometimes occur. In view of the foregoing, in order to supply the peak power, in some case, there is a need for the secondary batteries to provide a power capacity exceeding the satisfaction of the mean dissipation power x the operation assurance time. In this case, the use of the capacitors instead of the secondary batteries reduced in number as shown in FIG. 10, makes it possible to measure the peak power by utilizing the electric power stored in the capacitors on a sharing basis, without the secondary batteries exceeding the satisfaction of the mean dissipation power x the operation assurance time when the sudden peak power is required.

Figure 11:
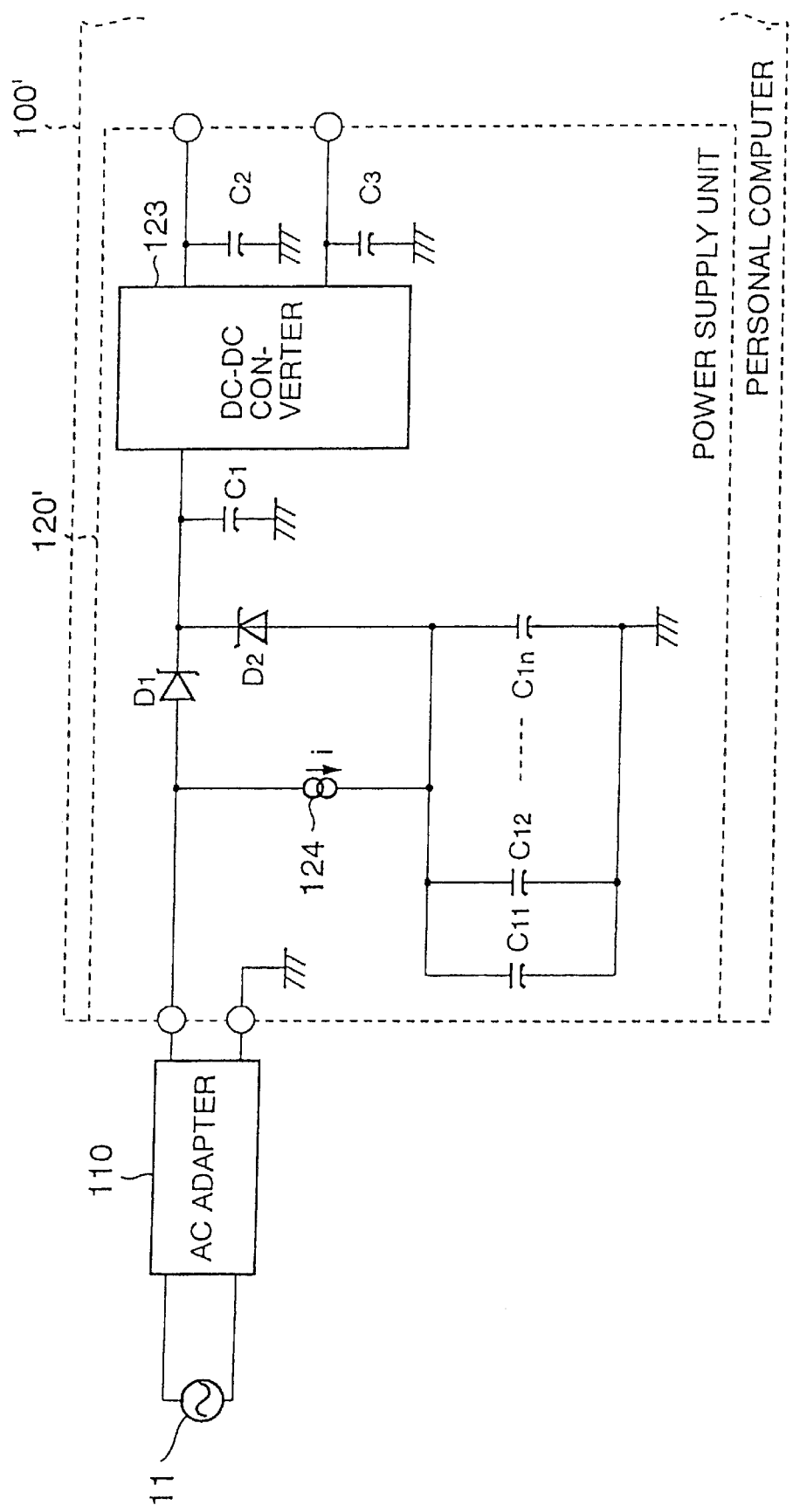
FIG. 11 is a circuit diagram of a power supply section of a note type of personal computer, which is an embodiment of an electronic apparatus according to the present invention.

FIG. 11 is a circuit diagram of a power supply section 120' of a personal computer 100', such as a notebook personal computer, which is an embodiment of an electronic apparatus according to the present invention.

An electric power of the commercial power supply 11 is fed via the AC adapter 110 to the power supply section 120' and then transmitted via the diode D1 for preventing a backflow to a DC—DC converter 123. The DC—DC converter 123 is the same as the DC—DC converter 123 shown in FIGS. 2 and 3, for instance. Capacitors C1, C2 and C3 are capacitors for voltage stabilization.

The power supply section 120' incorporates therein capacitors C1, C12 . . . C1n which are charged via a constant current source 124 having an in-rush current preventing function. An electric power stored in the capacitors C11, C12 . . . C1n is supplied via a diode D2 for preventing a backflow to the DC—DC converter 123. The charging path for charging the capacitors C11, C12, . . . , C1n and the power supplying path for supplying charged electric power stored in those capacitors to the DC—DC converter 123, are separated from one another. On the charging path, the constant current source 124 prevents an in-rush current from occurring when the capacitors are charged. On the power supplying path, the diode D2 prevents the backflow of the power.

In this manner, the use of the capacitors in the note type of personal computer 100' makes it possible to provide a power supply at the time of the momentary power cut of the commercial power supply 11 and a peak power supply momentarily exceeding an ability of the AC adapter 110.

While the present invention has been explained referring to a notebook personal computer by way of example, the present invention is applicable to a portable type of electronic apparatus such as a PDA, and a mobile type of personal computer, and also widely applicable to a general electronic apparatus.

As mentioned above, according to the present invention, it is possible to measure a momentary power cut and a large current which will be needed momentarily, upon reducing a load of a user.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for an electronic apparatus, comprising:
   a battery pack housing batteries;
   a pseudo battery pack comprising a power holding unit holding electric power to be supplied to the electronic apparatus; and
   a battery pack connection section connecting to the electronic apparatus, one of the battery pack when the electronic apparatus is used without an external power supply, and the pseudo battery pack when the electronic apparatus is used with an external power supply to supply electric power during a momentary power cut off.

2. The system for an electronic apparatus as recited in claim 1, wherein the pseudo battery pack comprises
   a charging path preventing or reducing in-rush current and charging the power holding unit upon receipt of a supply of the electric power from the external power supply, and
   a power supplying path supplying charged electric power stored in the power holding unit to the electronic apparatus while preventing a backflow of the power, the power supplying path being different from the charging path.

3. A system for an electronic apparatus, comprising:
   a battery pack housing batteries;
   a pseudo battery pack comprising a power holding unit holding electric power to be supplied to the electronic apparatus; and
   a battery pack connection section connecting to the electronic apparatus, one of the battery pack when the electronic apparatus is used without an external power supply, and the pseudo battery pack when the electronic apparatus is used with an external power supply to supply electric power if the external power supply delivers insufficient electric power to operate the electronic apparatus.

4. The system for an electronic apparatus as recited in claim 3, wherein the pseudo battery pack comprises
   a charging path preventing or reducing in-rush current and charging the power holding unit upon receipt of a supply of the electric power from the external power supply; and
   a power supplying path supplying charged electric power stored in the power holding unit to the electronic apparatus while preventing a backflow of the power, the power supplying path being different from the charging path.

5. A battery pack in an electronic apparatus comprising a battery pack connection section connecting the battery pack, the electronic apparatus being operable with one of electric power from an external power supply and electric power from the battery pack, the battery pack comprising:
   a battery; and
   a power holding unit holding electric power to be supplied to the electronic apparatus when the external power supply is short in power supply.

6. An electronic apparatus operative with electric power from an external power supply, the electronic apparatus comprising:
   a power holding unit charged with electric power from the external power supply to hold electric power to be supplied to the electronic apparatus, when the external power supply fails to supply the electric power;
   a charging path preventing or reducing in-rush current and charging the power holding unit upon receipt of a supply of the electric power from the external power supply; and
   a power supplying path supplying charged electric power stored in the power holding unit to the electronic apparatus while preventing a backflow of the power, the power supplying path being different from the charging path.

7. An electronic apparatus operative with electric power from an external power supply, the electronic apparatus comprising:
   a power holding unit charged with electric power from the external power supply to hold electric power to be supplied to the electronic apparatus, when the external power supply is short in power supply;
   a charging path preventing or reducing in-rush current and charging the power holding unit upon receipt of a supply of the electric power from the external power supply; and
   a power supplying path supplying charged electric power stored in the power holding unit to the electronic apparatus while preventing a backflow of the power, the power supplying path being different from the charging path.

8. A pseudo battery pack for an electronic apparatus, comprising:
   a battery pack mounting section detachably mounting to the electronic apparatus, one of a battery pack housing batteries when the electronic apparatus is used without an external power supply, and the pseudo battery pack when the electronic apparatus is used with an external power supply,
   wherein the pseudo battery pack comprises capacitors connected in parallel, and supplies electric power during a momentary power cut off.

9. The pseudo battery pack as recited in claim 8, wherein the pseudo battery pack comprises
   a charging path preventing or reducing in-rush current and charging capacitor upon receipt of a supply of the electric power from the external power supply; and
   a power supplying path supplying charged electric power stored in capacitor to the electronic apparatus while preventing a backflow of the power, the power supplying path being different from the charging path.

10. The pseudo battery pack as recited in claim 8, wherein the capacitors supply electric power stored in the capacitors to the electronic apparatus when supply of the electric power from the external power supply is stopped.

11. The pseudo battery pack as recited in claim 9, wherein the capacitors supply electric power stored in the capacitors to the electronic apparatus when supply of the electric power from the external power supply is stopped.

12. An electronic apparatus system, comprising:
    a battery pack housing batteries;
    a pseudo battery pack comprising capacitors connected in parallel; and
    an electronic apparatus comprising a battery pack mounting section detachably mounting to the electronic apparatus, one of the battery pack when the electronic apparatus is used without an external power supply, and the pseudo battery pack when the electronic apparatus is used with an external power supply to supply electric power during a momentary power cut off.

13. An system, comprising:
    an electronic apparatus;
    a pseudo battery pack; and
    a battery pack housing batteries detachably mounted to the electronic apparatus, the electronic apparatus being operable with one of electric power from an external power supply and electric power from the battery pack,
    wherein the pseudo battery pack comprises capacitors connected in parallel, and the pseudo battery pack comprises substantially same configuration as the battery pack.

14. The system as recited in claim 13, wherein the pseudo battery pack comprises a charging path for preventing or reducing in-rush current and charging the capacitor, upon receipt of a supply of the electric power from the external power supply, and a power supplying path for supplying charged electric power stored in the capacitor to the electronic apparatus while preventing a backflow of the power, the power supplying path being differnt the charging path.

15. An electronic apparatus system, comprising:
    an electronic apparatus;
    a battery pack housing batteries and being detachably mounted to the electronic apparatus when the electronic apparatus is used without an external power supply; and
    a pseudo battery pack comprising capacitors connected in parallel, the pseudo battery pack comprising substantially the same configuration as the battery pack, and being detachably mounted on the electronic apparatus when the electronic apparatus is used with an external power supply to supply electric power during a momentary power cut off.

16. An electronic apparatus system, comprising:
    a battery pack housing secondary batteries;
    a pseudo battery pack comprising capacitors connected in parallel, the pseudo battery pack comprising substantially same configuration as the battery pack; and
    an electronic apparatus detachably receiving one of the battery pack when the electronic apparatus is used without an external power supply, and the pseudo battery pack when the electronic apparatus is used with an external power supply to supply electric power during a momentary power cut off.

17. A system, comprising:
    a battery pack housing batteries;
    an electronic apparatus to which the battery pack is detachably mounted, the electronic apparatus being operable with one of electric power from an external power supply and electric power from the battery pack; and
    a capacitor in the battery pack connected in parallel with the housed batteries.

18. An electronic apparatus operative with electric power from an external power supply, the electronic apparatus comprising:
    a capacitor charged with electric power from the external power supply and supplying a charged electric power to the electronic apparatus to operate during a predetermined time, when the external power supply fails to supply the electronic power;
    a charging path preventing or reducing in-rush current and charging the capacitor upon receipt of a supply of the electric power from the external power supply; and
    a power supplying path supplying charged electric power stored in the capacitor while preventing a backflow of the power, the power supplying path being different from the charging path.

19. An electronic apparatus operative with electric power from an external power supply, the electronic apparatus comprising:
    a capacitor charged with electric power from the external power supply and supplying a charged electric power to the electronic apparatus to operate during a predetermined time, when the external power supply is short in power supply;
    a charging path preventing or reducing in-rush current and charging the capacitor upon receipt of a supply of the electric power from the external power supply; and
    a power supplying path supplying charged electric power stored in the capacitor while preventing a backflow of the power, the power supplying path being different from the charging path.

* * * * *